US011625847B2

(12) United States Patent
Yun

(10) Patent No.: US 11,625,847 B2
(45) Date of Patent: Apr. 11, 2023

(54) AROUND VIEW SYNTHESIS SYSTEM AND METHOD

(71) Applicant: HYUNDAI MOBIS CO., LTD., Seoul (KR)

(72) Inventor: Yeo Min Yun, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 327 days.

(21) Appl. No.: 17/000,345

(22) Filed: Aug. 23, 2020

(65) Prior Publication Data

US 2021/0225024 A1     Jul. 22, 2021

(30) Foreign Application Priority Data

Jan. 16, 2020  (KR) .................. 10-2020-0006190

(51) Int. Cl.
*G06T 7/70* (2017.01)
*G06T 15/00* (2011.01)
*B60R 1/00* (2022.01)

(52) U.S. Cl.
CPC ............ *G06T 7/70* (2017.01); *B60R 1/00* (2013.01); *G06T 15/00* (2013.01); *B60R 2300/102* (2013.01); *B60R 2300/105* (2013.01); *B60R 2300/303* (2013.01); *B60R 2300/307* (2013.01); *B60R 2300/802* (2013.01); *B60R 2300/8093* (2013.01); *G06T 2207/20212* (2013.01); *G06T 2207/30261* (2013.01)

(58) Field of Classification Search
CPC ............ B60R 1/00; B60R 2300/102; B60R 2300/105; B60R 2300/303; B60R 2300/307; B60R 2300/8093; B60R 2300/8086; B60R 2300/806; B60R 2300/804; B60R 2300/8033; G06T 2207/20212; G06T 2207/20221; G06T 2207/20216; G06T 2207/30261; G06T 2207/30264; G06T 2207/30268; G06T 2207/30252; G06T 7/70
USPC ........................................ 348/148
See application file for complete search history.

(56) References Cited

U.S. PATENT DOCUMENTS

| | | | |
|---|---|---|---|
| 8,446,471 B2 * | 5/2013 | Wu ............... | G06T 3/4038 348/148 |
| 8,576,285 B2 | 11/2013 | Gomi et al. | |
| 8,655,019 B2 | 2/2014 | Kamiyama | |
| 8,750,572 B2 | 6/2014 | Gloger et al. | |
| 9,485,438 B2 | 11/2016 | Sakaniwa et al. | |

(Continued)

FOREIGN PATENT DOCUMENTS

| DE | 10 2009 036 200 | 5/2010 |
|---|---|---|
| DE | 10 2011 088 332 | 6/2013 |

(Continued)

*Primary Examiner* — Nathnael Aynalem
(74) *Attorney, Agent, or Firm* — H.C. Park & Associates, PLC

(57) ABSTRACT

The present invention discloses an around view synthesis system, including: a plurality of cameras each mounted in a vehicle to capture respective different areas around the vehicle; a boundary setting unit setting a synthesis boundary of images captured in an overlapping region where images captured by the plurality of cameras are overlapped; and an image synthesizer receiving the images captured by the plurality of cameras and synthesizing the received images according to the synthesis boundary set by the boundary setting unit.

12 Claims, 10 Drawing Sheets

(56) References Cited

U.S. PATENT DOCUMENTS

| | | | |
|---|---|---|---|
| 2008/0192043 A1* | 8/2008 | Fujii | G06T 15/503 |
| | | | 345/419 |
| 2012/0170812 A1* | 7/2012 | Kamiyama | G06T 3/4038 |
| | | | 382/103 |
| 2012/0219190 A1* | 8/2012 | Kumagai | G06T 7/55 |
| | | | 382/104 |
| 2018/0150703 A1 | 5/2018 | You | |
| 2018/0213162 A1 | 7/2018 | Tsutsumitake | |
| 2019/0275970 A1* | 9/2019 | Sato | B60R 1/00 |
| 2019/0351824 A1* | 11/2019 | Kim | G06T 7/11 |
| 2020/0361378 A1 | 11/2020 | Omiya et al. | |
| 2021/0178968 A1* | 6/2021 | Yamanaka | B62D 15/0285 |

FOREIGN PATENT DOCUMENTS

| | | |
|---|---|---|
| DE | 10 2016 117 518 | 3/2018 |
| JP | 2007-89081 | 4/2007 |
| JP | 2010-231276 | 10/2010 |
| JP | 2014-090349 | 5/2014 |
| JP | 2019-140518 | 8/2019 |
| KR | 10-1567405 | 11/2015 |
| KR | 10-2017-0019793 | 2/2017 |
| KR | 10-1729486 | 4/2017 |
| KR | 10-2018-0083762 | 7/2018 |
| WO | 2011-036892 | 3/2011 |

\* cited by examiner

AROUND VIEW SYNTHESIS SYSTEM AND METHOD

CROSS REFERENCE TO RELATED APPLICATION

This application claims priority from and the benefit of Korean Patent Application No. 10-2020-0006190, filed Jan. 16, 2020, which is hereby incorporated by reference for all purposes as if set forth herein.

BACKGROUND

Field

Exemplary embodiments relate to an around view synthesis system and method and, more particularly, to a system and method of forming an around view of a vehicle by synthesizing a plurality of images.

Discussion of the Background

Recently, for the convenience of the driver, the development and commercialization of an intelligent vehicle is in progress. In particular, the intelligent vehicle includes an around view monitor (AVM) system that provides images around the vehicle and a blind-spot view monitor (BVM) system that displays an image of rear side of the vehicle.

Specifically, the around view monitor system is a system that synthesizes images captured by cameras provided in each of front, rear, left and right of the vehicle to display the same as an image.

However, since the around view monitor system provides a synthesis image obtained by synthesizing images obtained through cameras in front, rear, left, and right, a blind area is generated in a boundary region between each image in the synthesis image due to a difference in angles of view of each camera. When an obstacle exists in the blind area, the obstacle may not appear in the synthesized image or may appear only in any one image.

That is, in the around view monitor system, there is a problem that an obstacle is doubly visible or invisible at the synthesis boundary of each image, whereby the reliability of the around view monitor system is deteriorated, so that it is difficult to replace the blind-spot view monitor system due to stability.

The matters described as the background art are only for the purpose of improving the understanding of the background of the present invention and should not be taken as acknowledging that they correspond to the related arts already known to those skilled in the art.

The above information disclosed in this Background section is only for enhancement of understanding of the background of the invention and, therefore, it may contain information that does not constitute prior art.

SUMMARY

Accordingly, the present invention has been made keeping in mind the above problems occurring in the prior art, and an objective of the present invention is to provide a system and method of forming an around view of a vehicle by varying boundaries between a plurality of images to be synthesized.

In order to achieve the above object, an around view synthesis system according to the present invention includes a plurality of cameras each mounted in a vehicle to capture respective different areas around the vehicle; a boundary setting unit setting a synthesis boundary of images captured in an overlapping region where images captured by the plurality of cameras are overlapped; and an image synthesizer receiving the images captured by the plurality of cameras and synthesizing the received images according to the synthesis boundary set by the boundary setting unit.

The plurality of cameras may include a first camera capturing a front of the vehicle; a second camera capturing a rear of the vehicle; a third camera capturing a left side of the vehicle; and a fourth camera capturing a right side of the vehicle.

The boundary setting unit may detect an obstacle in the overlapping region and sets the synthesis boundary on the basis of the detection state of the obstacle.

The system may further include a sensor detecting the obstacle around the vehicle, wherein the boundary setting unit detects the obstacle in the overlapping region using sensing information sensed by the sensor or the images captured by the plurality of cameras.

The boundary setting unit may set an upper layer among the images captured by the plurality of cameras that are overlapped in the overlapping region and set a synthesis boundary of an image set as the upper layer on the basis of the detection state of the obstacle.

When an obstacle is detected in only one image of the images captured by the plurality of cameras that are overlapped in the overlapping region, the boundary setting unit may set, as the upper layer, the image in which the obstacle is detected and sets the synthesis boundary of the image set as the upper layer to be located outside of the detected obstacle; and the image synthesizer may synthesize the upper layer and the lower layer among the images captured by the plurality of cameras.

When the same obstacle is detected in all the images captured by the plurality of cameras that are overlapped in the overlapping region, the boundary setting unit may set, as an upper layer, an image captured in a direction crossing an advancing direction of the vehicle and set a synthesis boundary of the image set as the upper layer to be located outside the detected obstacle; and the image synthesizer may synthesize the upper layer and the lower layer among the images captured by the plurality of cameras.

When only a part of obstacles detected in a first image among the images captured by the plurality of cameras that are overlapped in the overlapping region is detected in a second image, the boundary setting unit may set the synthesis boundary to be located outside an obstacle located at an outermost side of the obstacles detected in the first image.

When obstacles different from each other are detected in the images captured by the plurality of cameras that are overlapped in the overlapping region, the boundary setting unit may set the synthesis boundary of the images to be located between the obstacles different from each other.

The image synthesizer may synthesize a three-dimensional around view image facing the vehicle at a view point of a level higher than a vehicle body of the vehicle, and the system may further include an image display displaying the three-dimensional around view image synthesized by the image synthesizer.

The image display may display the image with increasing a transparency of the vehicle when the obstacle is overlapped with the vehicle to be hidden in the three-dimensional around view image.

In order to achieve the above object, an around view synthesis method according to the present invention includes capturing respective different areas around a vehicle by a plurality of cameras each mounted in the vehicle; setting a synthesis boundary of images captured in an overlapping region where images captured by the plurality of cameras are overlapped; and synthesizing the images captured by the plurality of cameras according to the set synthesis boundary.

Before setting of the synthesis boundary, the method further includes detecting an obstacle in the overlapping region using sensing information sensed by a sensor sensing the obstacle around the vehicle or the images captured by the plurality of cameras, wherein in the setting of the synthesis boundary, a synthesis boundary is set on the basis of the detection state of the obstacle.

The setting of the synthesis boundary may include detecting the position of the obstacle and setting the synthesis boundary on the basis of the detected position of the obstacle, when the obstacle is detected in the overlapping region.

The setting of the synthesis boundary may include setting an upper layer among images captured by the plurality of cameras that are overlapped in the overlapping region on the basis of the detection state of the obstacle, and setting a synthesis boundary of the image set as the upper layer.

The method may further includes synthesizing a three-dimensional around view image facing the vehicle at a view point of a level higher than a vehicle body of the vehicle in the synthesizing of the images; and displaying the synthesized three-dimensional around view image after the synthesizing of the images.

The displaying of the image may include displaying the image with increasing a transparency of the vehicle, when the obstacle is overlapped with the vehicle to be hidden in the three-dimensional around view image.

According to the around view synthesis system and method of the present invention, the obstacle around the vehicle is prevented from being doubly visible or invisible, thereby improving the reliability of the around view.

In addition, the synthesized around view may replace the blind-spot view monitor (BVM) system of the vehicle, thereby improving the visibility of obstacles located in rear side of the vehicle. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other objects, features, and other advantages of the present invention will be more clearly understood from the following detailed description when taken in conjunction with the accompanying drawings, in which.

DETAILED DESCRIPTION OF THE INVENTION

Figure 1:
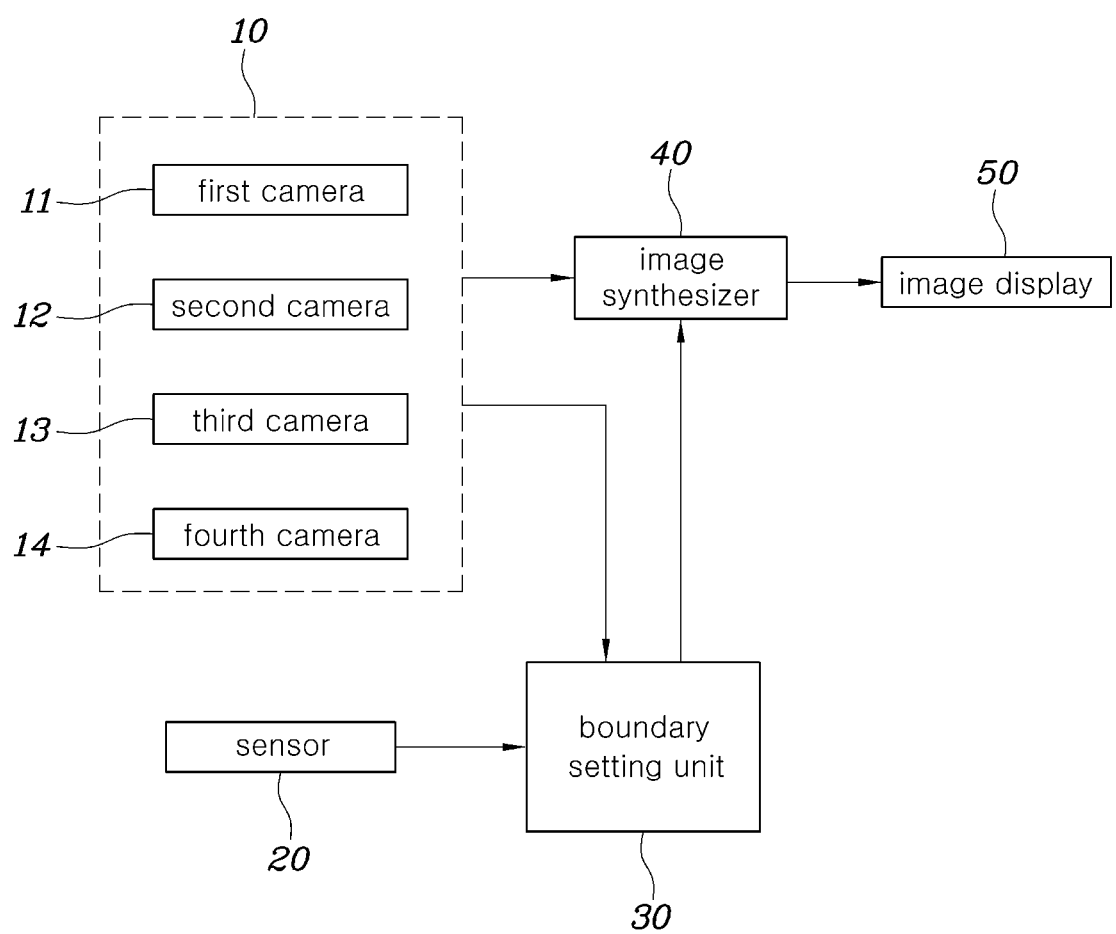
FIG. 1 is a block diagram illustrating an around view synthesis system according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements Specific structural to functional descriptions according to embodiments of the present invention disclosed herein are only illustrated for the purpose of describing the embodiments according to the present invention, and the embodiments according to the present invention may be implemented in various forms and should not be construed as limited to the embodiments described herein.

Since the embodiments according to the present invention can be variously modified and have various forms, specific embodiments will be illustrated in the drawings and described in detail in the present specification. However, this is not intended to limit the embodiments in accordance with the concept of the present invention to a particular disclosed form, it should be understood to include all changes, equivalents, and substitutes included in the spirit and scope of the present invention.

Terms such as first and/or second may be used to describe various components, but the components should not be limited by the terms. The terms are used only for the purpose of distinguishing one component from other components, and for example, without departing from the scope of the rights according to the inventive concept, the first component may be called a second component, and the second component may also be referred to as the first component.

When a component is said to be "connected" or "coupled" to another component, it should be understand that the component is directly connected or coupled to that another component, as well as another component is present therebetween. Meanwhile, when a component is said to be "directly connected" or "directly coupled" to another component, it should be understood that there is no other component in between. Other expressions describing the relationship between components, such as "between" and "immediately between" or "neighboring to" and "directly neighboring", should be interpreted as well.

The terminology used herein is for the purpose of describing particular embodiments only and is not intended to be limiting of the invention. Singular expressions include plural expressions unless the context clearly indicates otherwise. As used herein, terms "comprise" or "have" are intended to indicate that there is a feature, number, step, action, component, part, or combination thereof that is described, and that one or more other features or numbers are present. It is to be understood that the present invention does not exclude, in advance, the possibility or addition of steps, actions, components, parts or combinations thereof.

Unless defined otherwise, all terms used herein, including technical or scientific terms, have the same meaning as commonly understood by one of ordinary skill in the art. Terms such as those defined in the commonly used dictionaries should be construed as meanings consistent with the meanings in the context of the related art and shall not be construed in ideal or excessively formal meanings unless expressly defined herein.

Hereinafter, exemplary embodiments of the present invention will be described in detail with reference to the accompanying drawings. Like reference numerals in the drawings denote like elements.

Figure 2:
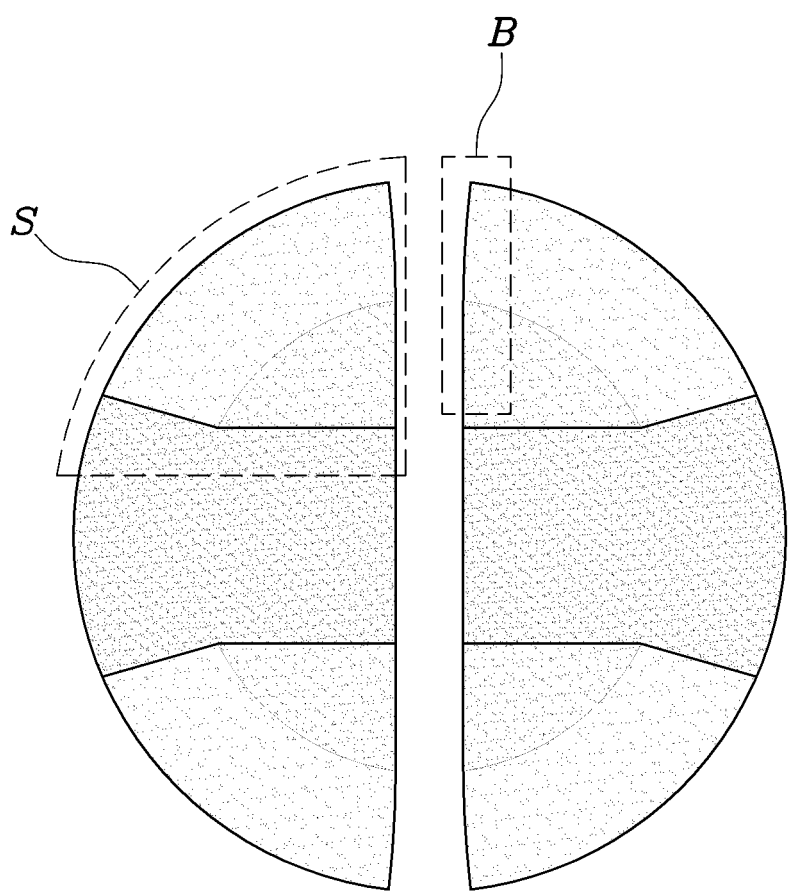
FIG. 2 is a diagram illustrating a synthetic model according to an embodiment of the present invention.
Figure 3A:
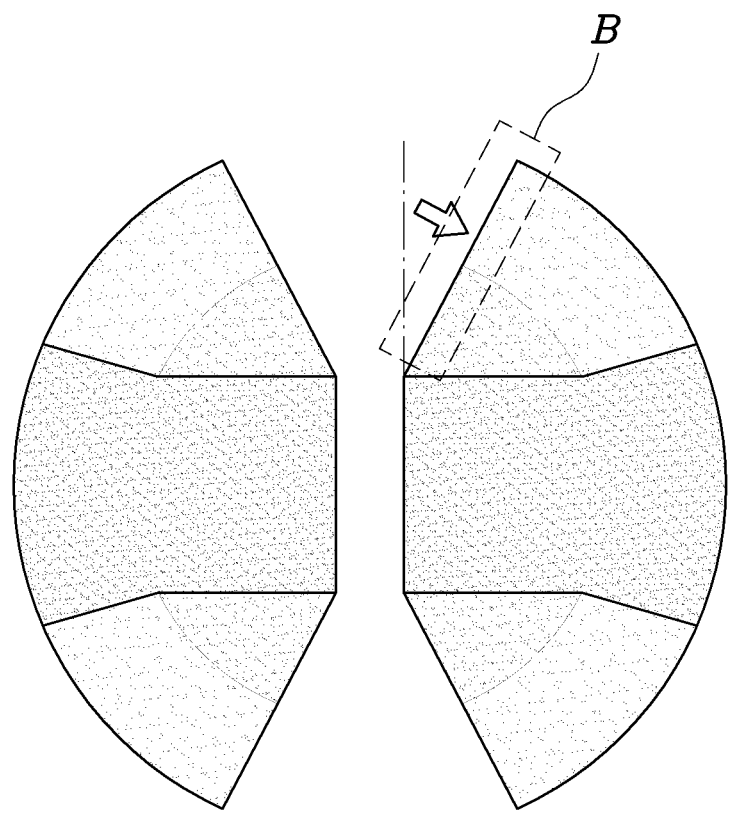
FIGS. 3A and 3B are diagrams illustrating a synthesis model with varying synthesis boundaries according to an embodiment of the present invention.
Figure 3B:
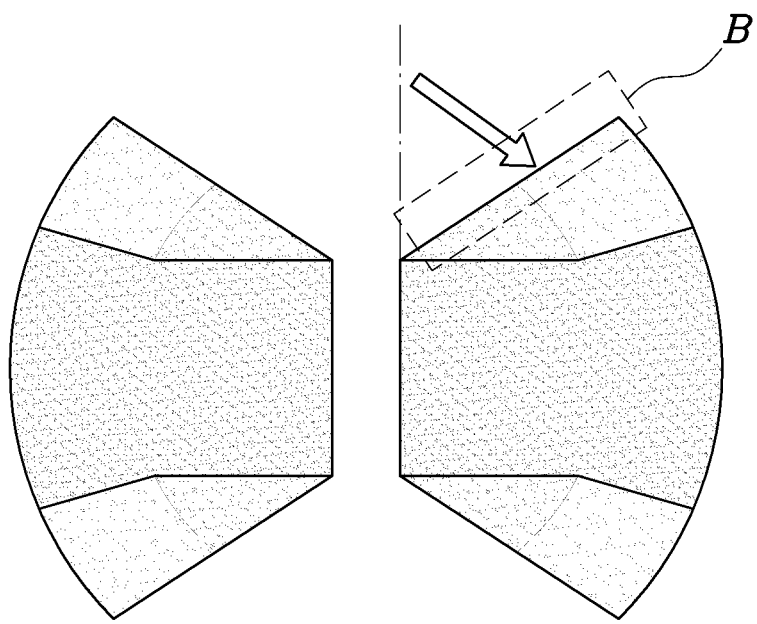

FIG. 1 is a block diagram illustrating an around view synthesis system according to an embodiment of the present invention; FIG. 2 is a diagram illustrating a synthetic model according to an embodiment of the present invention; and FIGS. 3A and 3B are diagrams illustrating a synthesis model with varying synthesis boundaries according to an embodiment of the present invention.

Referring to FIGS. 1 to 3, an around view synthesis system according to an embodiment of the present invention includes a plurality of cameras 10 each mounted in a vehicle V to capture respective different areas around the vehicle V; a boundary setting unit 30 setting a synthesis boundary B of images captured in an overlapping region S where images captured by the plurality of cameras 10 are overlapped; and an image synthesizer 40 receiving images captured by a plurality of cameras 10 and synthesizing the received images according to the synthesis boundary B set by the boundary setting unit 30.

The plurality of cameras 10 may be mounted in the vehicle V to capture the respective front, left, right, and rear sides of the vehicle V. In particular, the plurality of cameras 10 may be positioned at the respective front, left, right, and rear of the vehicle V, respectively, to capture the periphery of the vehicle V. Images captured by the cameras 10 adjacent to each other may be partially overlapped with each other.

The image synthesizer 40 may synthesize an around view by synthesizing the images captured by each of the plurality of cameras 10. However, the images captured by the plurality of cameras 10 may partially be overlapped with each other, and the images may be synthesized along the synthesis boundary B in the overlapped region.

According to the related art, there is a problem that an obstacle O positioned at the overlapping region S is invisible or doubly visible in the synthesized around view.

The boundary setting unit 30 may set a synthesis boundary B synthesizing images captured by the adjacent cameras 10 in the overlapping region S where the images captured by the plurality of cameras 10 are overlapped with each other.

The boundary setting unit 30 and the image synthesizer 40 according to an embodiment of the present invention may be implemented through a non-volatile memory (not shown) configured to store an algorithms configured to control operations of various components of the vehicle V or data relating to software instructions for reproducing the algorithm, and a processor (not shown) configured to perform operations described below using the data stored in the memory. Herein, the memory and the processor may be implemented as separate chips. Alternatively, the memory and the processor may be implemented as a single chip integrated with each other. The processor may take a form of one or more processors.

Specifically, as shown in FIGS. 2 and 3, the synthetic model according to an embodiment of the present invention may be a three-dimensional hemisphere or a U-shaped shape. FIGS. 2 and 3 are diagrams illustrating a (two dimensional) top view of the synthesis model.

In the 3D synthesis model, an overlapping region S in which images captured by the plurality of cameras 10 are overlapped with each other may be formed. The synthesis boundary B may be formed within the overlapping region S so that the bottom image around the synthesized vehicle V may be always displayed in the around view image.

The synthesis boundary B may be varied within the overlapping region S. In particular, as shown in FIGS. 3A to 3B, the synthesis boundary B may be varied within the overlapping region S.

Specifically, the plurality of cameras 10 includes a first camera 11 capturing the front of the vehicle V; a second camera 12 capturing the rear of the vehicle V; a third camera 13 capturing the left side of the vehicle V; and a fourth camera 14 capturing the right side of the vehicle V.

The first camera 11 is located in the front of the vehicle V, the second camera 12 is located in the rear of the vehicle V, the third camera 13 is located in the left side of the vehicle V, and the fourth camera 14 is located in the right side of the vehicle V.

In the boundary setting unit 30, an obstacle O may be detected in the overlapping region S, and the synthesis boundary B may be set on the basis of the detection state of the obstacle O.

The boundary setting unit 30 may set the overlapping region S as a region of interest (ROI) and detect the obstacle O located within the overlapping region S.

In addition, the boundary setting unit 30 may recognize a type of the obstacle O located in the overlapping region S, or the like, and when the plurality of obstacles O are detected, the boundary setting unit 30 may identify whether the plurality obstacles O are the same to each other or different from each other.

The system according to an embodiment of the present invention further includes a sensor 20 detecting the obstacle (O) around the vehicle V, in which the boundary setting unit 30 detects the obstacle O in the overlapping region S using sensing information sensed by the sensor 20 or images captured by the plurality of cameras 10.

The sensor 20 may be, for example, an ultrasonic sensor mounted on the bumper of the vehicle V, or may be a LiDAR or a radar sensor.

The boundary setting unit 30 may detect whether the obstacle O is located in the overlapping region S of the 3D synthesis model. In addition, the detected obstacle O may be detected by using images captured by the sensor 20 or the plurality of cameras 10. Herein, a type of obstacle O (vehicle V, pedestrian, structure, etc.) may be detected using deep learning or machine learning artificial intelligence.

In addition, the boundary setting unit 30 may convert a position coordinate of a two-dimensional synthesis model into a position coordinate of a three-dimensional synthesis model with respect to the detected obstacle O. The boundary setting unit 30 may set the synthesis boundary B on the basis of position of the three-dimensional synthesis model of the obstacle O.

When the obstacle O is not detected in the overlapping region S, the boundary setting unit 30 may use the preset synthesis boundary B as the synthesis boundary B as it is.

Herein, the synthesis boundary B may be preset as one side or the other side boundary of the overlapping region S. Alternatively, the preset synthesis boundary B may be preset to the center of the overlapping region S.

The boundary setting unit 30 may detect the position of the obstacle O when the obstacle O is detected in the overlapping region S, and set the synthesis boundary B on the basis of the position of the obstacle O. In particular, the boundary setting unit 30 may move the predetermined synthesis boundary B on the basis of the position of the obstacle O detected within the overlapping region S.

FIGS. 4 to 7 are diagrams illustrating setting of a synthesis boundary according to various embodiments of the present invention.

Referring to FIGS. 4 to 7, the boundary setting unit 30 sets an upper layer among images captured by the plurality of cameras 10 that are overlapped in the overlapping region S on the basis of the detection state of the obstacle O, and sets a synthesis boundary B of the image set as the upper layer.

The image synthesizer 40 may synthesize the plurality of images in such a manner that as to be overlapped with each other, with an image by the boundary setting unit 30 being set as an upper layer and an image overlapped with the upper layer in the overlapping region S being set as a lower layer.

Figure 4:
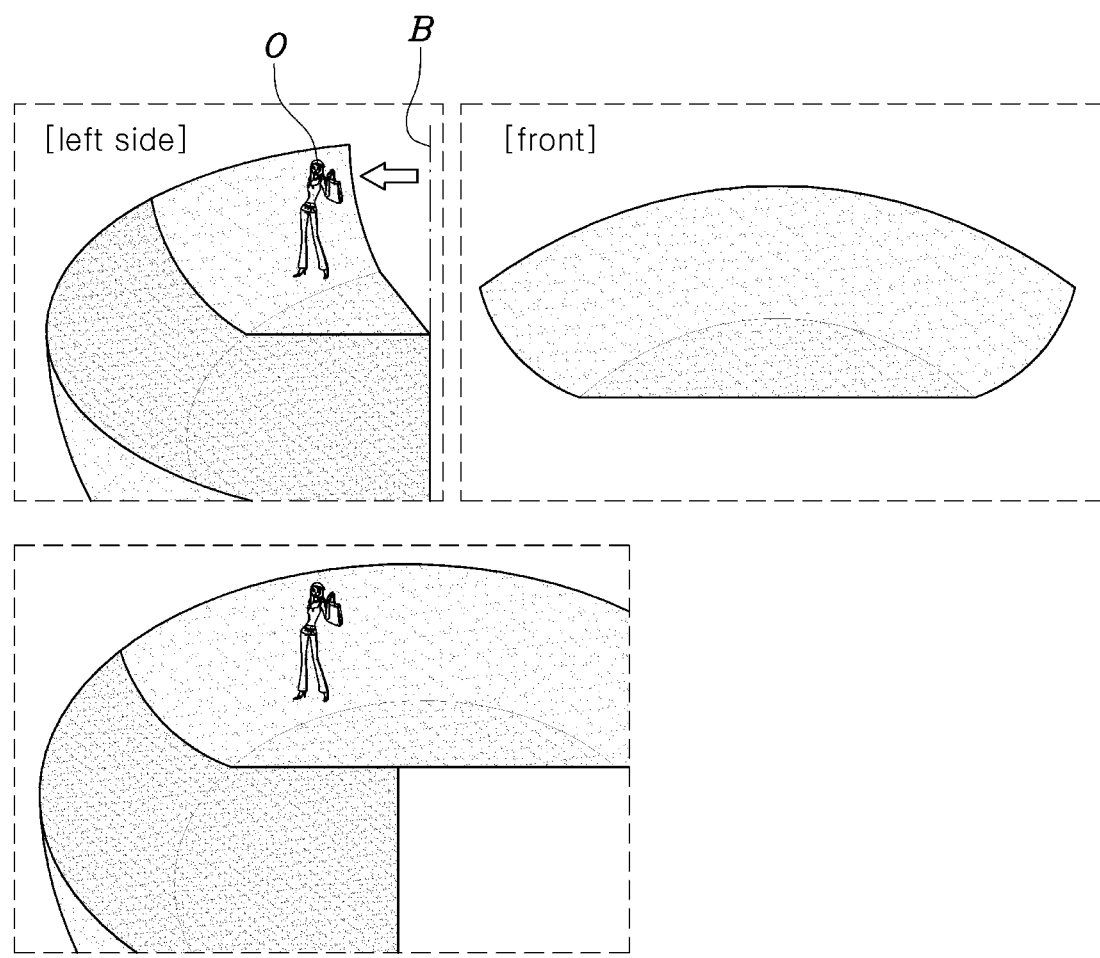
FIGS. 4, 5, 6, and 7 are diagrams illustrating setting of a synthesis boundary according to various embodiments of the present invention.

More specifically, as illustrated in FIG. 4, in the boundary setting unit 30, when the obstacle O is detected only in any one among images captured by the plurality of cameras 10 that are overlapped in the overlapping region S, the image for which the obstacle O is detected is set as an upper layer, and the synthesis boundary B of the image set as the upper layer is set to be located outside the detected obstacle O. In the image synthesizer 40, the upper layer and the lower layer of images captured by the plurality of cameras 10 may be synthesized through alpha blending.

Herein, the alpha blending refers to a technique of expressing a transmission image by adding a variable a representing transparency to general image data and may be a translucently rendering function.

As illustrated, when the obstacle O is detected in the left image and the obstacle O is not detected in the front image, the boundary setting unit 30 may set the left image as the upper layer. In addition, the boundary setting unit 30 may move the synthesis boundary B of the left image set as the upper layer.

The image synthesizer 40 may form an around view by synthesizing the left side image and the front image according to the synthesis boundary B of the left side image set by the boundary setting unit 30.

Figure 5:
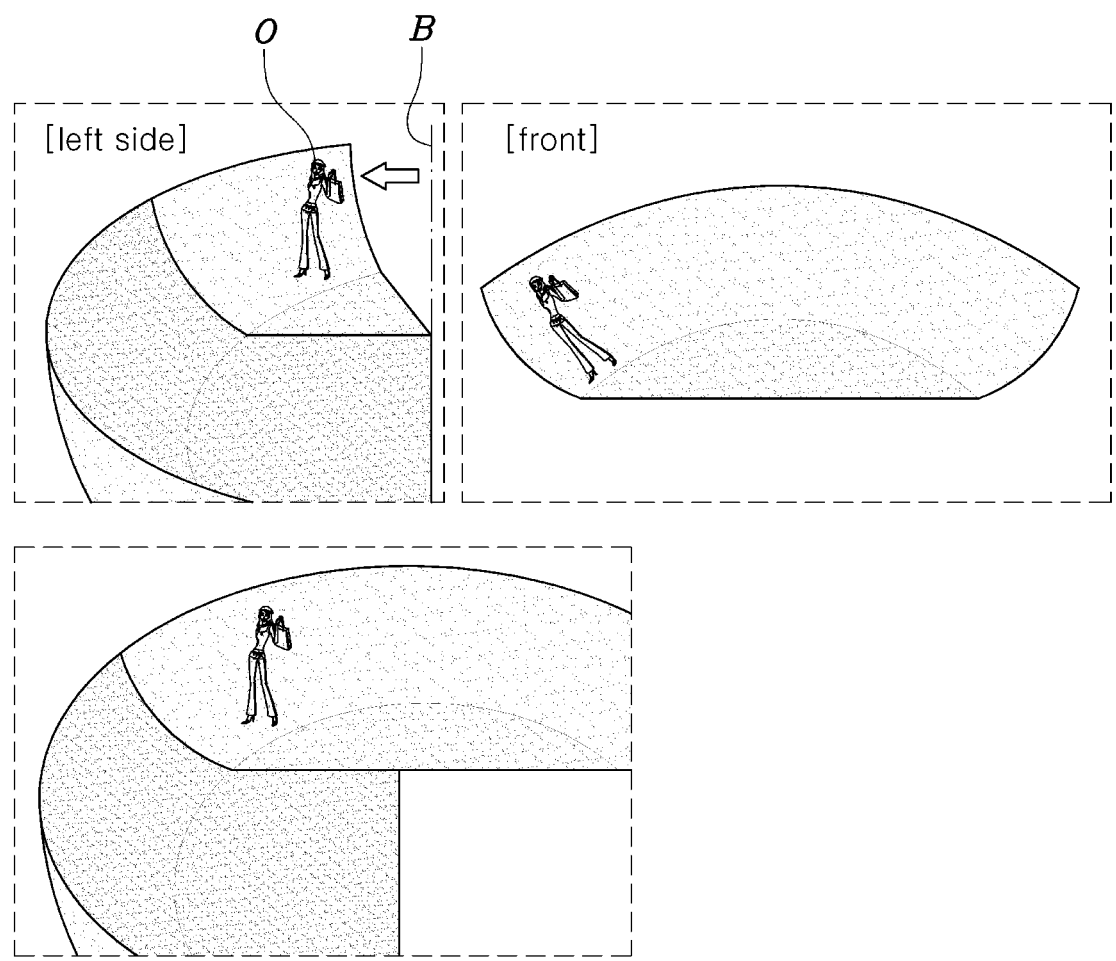

In addition, as illustrated in FIG. 5, in the boundary setting unit 30, when the same obstacle O is detected in all of the images captured by the plurality of cameras 10 that are overlapped in the overlapping region S, an image captured in the direction crossing the advancing direction of the vehicle V is set as the upper layer, and the synthesis boundary B of the image set as the upper layer is set to be located outside the detected obstacle O. The image synthesizer 40 may synthesize the upper layer and the lower layer of images captured by the plurality of cameras 10 through alpha blending.

As illustrated, when the same obstacle O is detected in the left image and the front image, the boundary setting unit 30 may set the left image as the upper layer. In addition, the boundary setting unit 30 may move the synthesis boundary B of the left image set as the upper layer.

In particular, the boundary setting unit 30 may give priority to the left side image or the right side image compared to the front image or the rear image. Accordingly, even when the vehicle V moves along the advancing direction, the obstacle O may be detected in the image captured in the direction crossing the advancing direction of the vehicle V for a relatively long time.

The image synthesizer 40 may form an around view by synthesizing the left side image and the front image according to the synthesis boundary B of the left side image set by the boundary setting unit 30.

Figure 6:
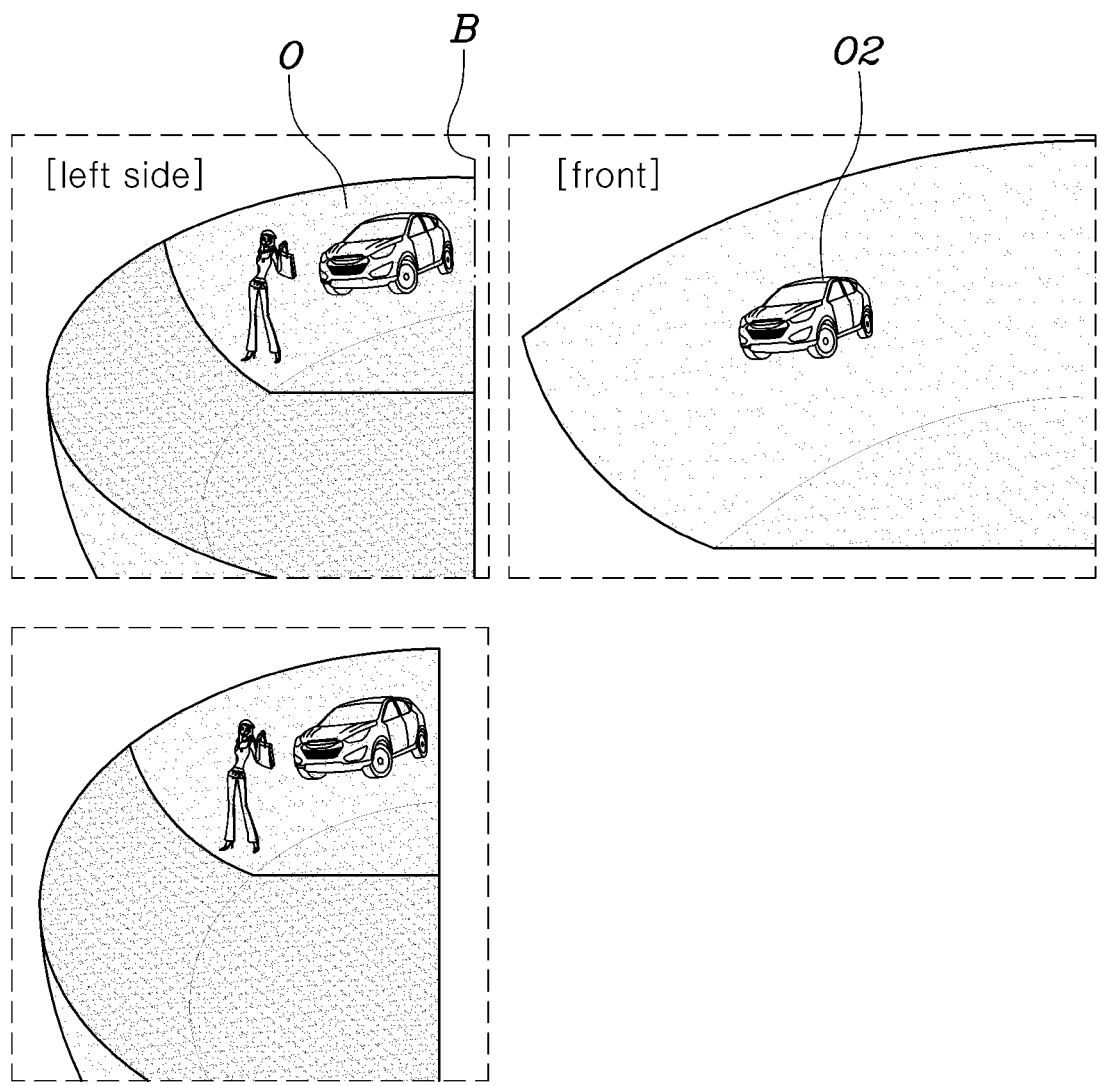

As illustrated in FIG. 6, a part (obstacle O2) of obstacles O1 and O2 detected in the first image among the images captured by the plurality of cameras 10 that are overlapped in the overlapping region S may be detected in the second image, the boundary setting unit 30 may set the synthesis boundary B to be located outside the obstacle O2 located at the outermost side of the obstacles O detected in the first image.

As shown, when only a part of obstacles O1 and O2 detected in the left image are detected in the front image, the synthesis boundary B is set to be located outside the obstacle O2 positioned at the outermost side of the obstacles O1 and O2 detected in the left image. That is, when the person (O1) and the vehicle V (O2) are detected in the left-side image, the synthesis boundary B may be set outside the vehicle V (O2) located at the outermost side.

Herein, the boundary setting unit 30 may set the image having more obstacles O1 and 12, as an upper layer. That is, the boundary setting unit 30 may set the left image as the upper layer, and the image synthesizer 40 may form an around view by synthesizing the left image and the front image.

However, in this case, the left side image and the front image may be synthesized such that the left side image (the first image) set as the upper layer faces upward without applying alpha blending.

Figure 7:
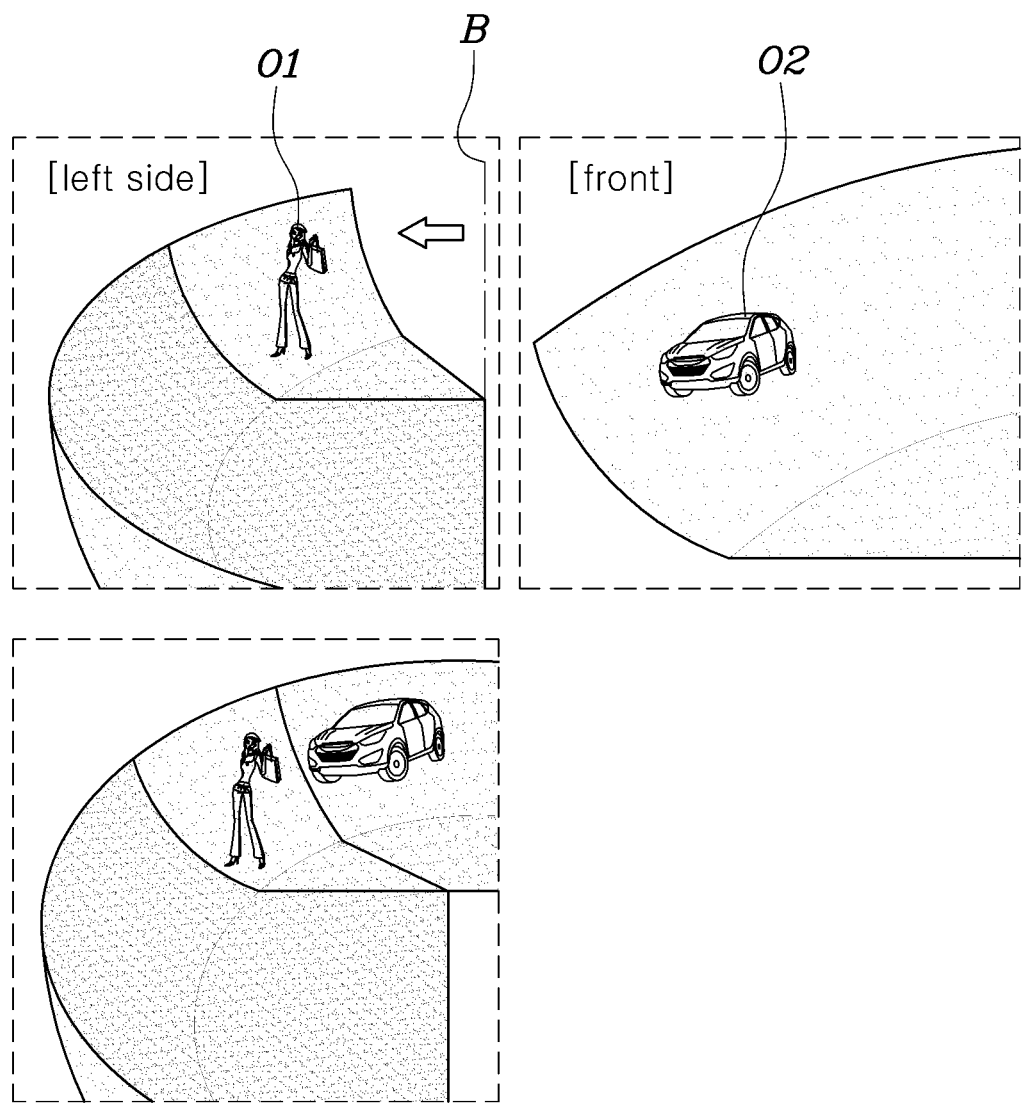

As shown in FIG. 7, in the boundary setting unit 30, when obstacles O1 and O2 different from each other are detected in images captured by the plurality of cameras 10 that are overlapped in the overlapping region S, the synthesis boundary B of the image may be set to be positioned between the obstacles O1 and O2.

When the obstacles O1 and O2 are detected in the first image and the second image, the layer order of the first image and the second image may be applied regardless of each other. In the boundary setting unit 30, the first image and the second image may be synthesized on the basis of the synthesis boundary B without applying alpha blending.

In particular, the boundary setting unit 30 may set a synthesis boundary B in both the first image and the second image such that the first image and the second image are not overlapped with each other, and synthesize the first image and the second image along the synthesis boundary B.

Figure 8:
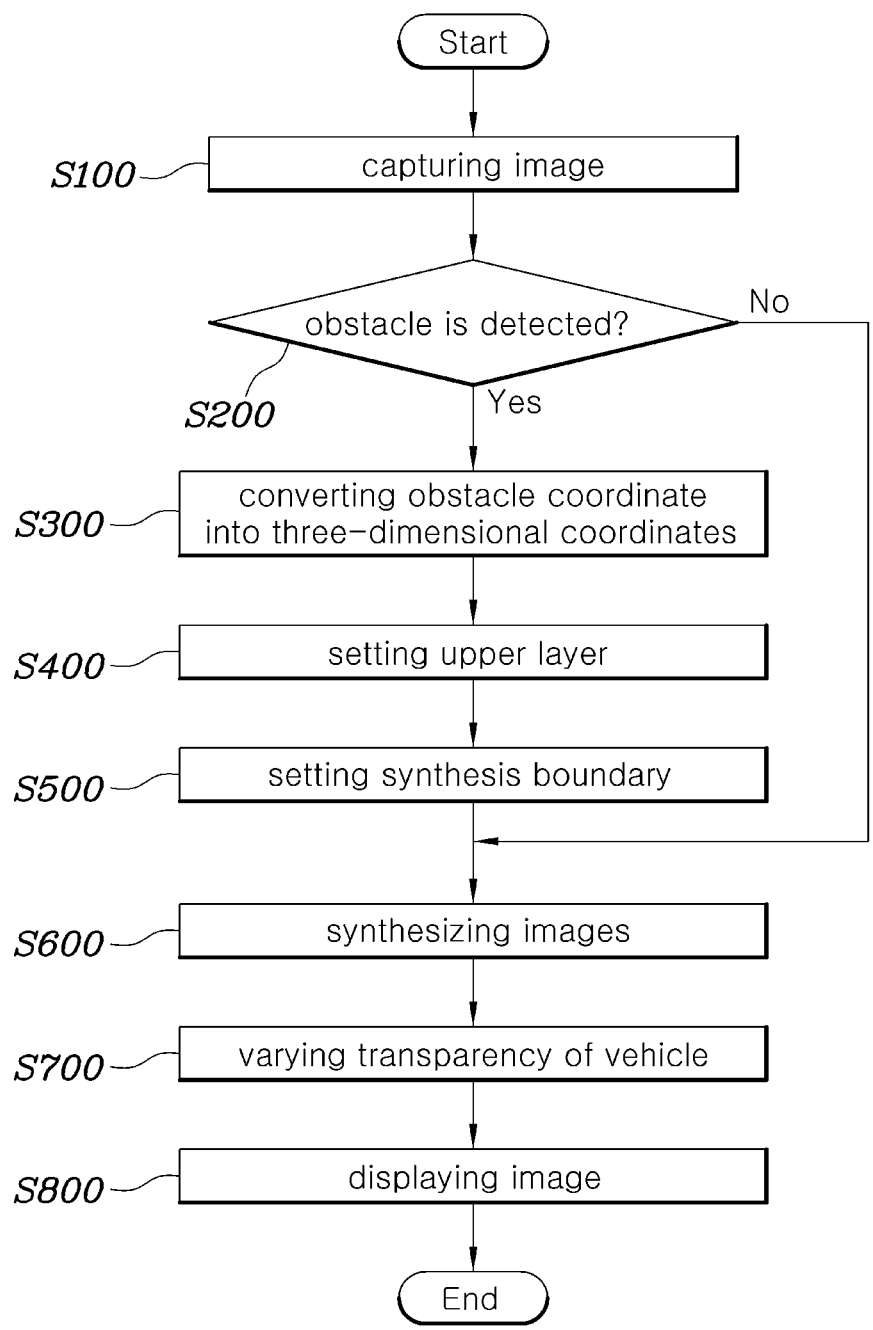
FIG. 8 is a diagram illustrating a three-dimensional around view image according to an embodiment of the present invention.

FIG. 8 is a diagram illustrating a three-dimensional around view image according to an embodiment of the present invention.

Referring to FIG. 8, the image synthesizer 40 may synthesize a three-dimensional around view image facing the vehicle V at a view point higher than a vehicle body of the vehicle V.

The three-dimensional around view may be an image around the vehicle V facing the vehicle V from the outside of the vehicle V, and the view point may be located to be higher than the vehicle body of the vehicle V in order to improve the sense of distance between the obstacle O and the vehicle V.

Specifically, in the case of the blind-spot view monitor (BVM) system according to the related art, since the view point is located to be at a level lower than the vehicle body, it is difficult for the driver to feel a sense of distance between the vehicle V and the obstacle O positioned around the vehicle V. In order to solve this problem, the three-dimensional around view may be provided such that the view point is located at a level higher than the vehicle body.

The system according to an embodiment of the present invention further includes an image display 50 displaying a three-dimensional around view image synthesized by the image synthesizer 40.

The image display 50 may be a display device that displays to the driver a three-dimensional around view image synthesized by the image synthesizer 40.

The image display 50 may automatically display the synthesized three-dimensional around view image to the driver, when the direction indicator is turned on by the driver's operation or when the obstacle O is detected according to the images captured by the plurality of cameras 10 or the sensing information of the sensor 20.

When the obstacle O is overlapped with the vehicle V to be hidden in the three-dimensional around view image, the image display 50 may display the image with the transparency of the vehicle V increasing.

That is, when the obstacle O is positioned behind the vehicle V when viewed from the three-dimensional around view image so that the obstacle O is overlapped with the vehicle V to be hidden, the vehicle body of the vehicle V may be translucently displayed. Accordingly, the display of the obstacle O image may be prevented from being disturbed in the three-dimensional around view.

Figure 9:
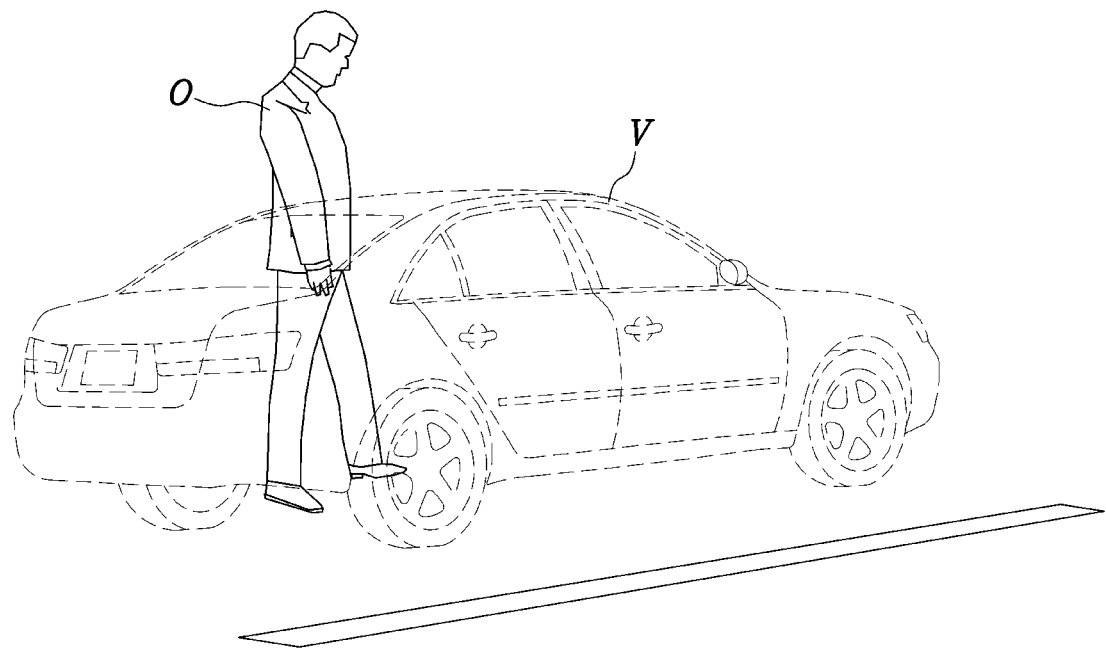
FIG. 9 is a flowchart illustrating an around view synthesis method according to an embodiment of the present invention.

FIG. 9 is a flowchart illustrating an around view synthesis method according to an embodiment of the present invention.

Referring to FIG. 9, an around view synthesis method according to an embodiment of the present invention includes capturing respective different areas around a vehicle V by a plurality of cameras 10 each mounted in the vehicle V (S100); setting a synthesis boundary B of images captured in an overlapping region S where images captured by the plurality of cameras 10 are overlapped (S500); and synthesizing images captured by the plurality of cameras 10 according to the set synthesis boundary B (S600).

Before setting of the synthesis boundary B (S500), the method further includes detecting an obstacle O in the overlapping region S using sensing information sensed by a sensor 20 sensing the obstacle O around the vehicle V or images captured by the plurality of cameras 10 (S200), and in the setting of the synthesis boundary B (S500), the synthesis boundary B may be set on the basis of the detection state of the obstacle O.

The setting of the synthesis boundary includes detecting the position of the obstacle O and setting the synthesis boundary B on the basis of the detected position of the obstacle O, when the obstacle O is detected in the overlapping region S.

In detail, when the obstacle O is detected in the overlapping region S, the detection coordinate (two-dimensional model) of the obstacle may be converted into three-dimensional model coordinates (S300). In addition, the synthesis boundary B may be set on the basis of the converted three-dimensional model coordinate of the obstacle (S500).

The setting of the synthesis boundary B (S500) includes setting an upper layer among images captured by the plurality of cameras 10 that are overlapped in the overlapping region S on the basis of the detection state of the obstacle O (S400), and setting a synthesis boundary B of an image set as the upper layer (S500).

The synthesizing of the image (600) includes synthesizing a three-dimensional around view image facing the vehicle V at a view point higher than the body of the vehicle V; and the method further includes displaying the synthesized three-dimensional around view image (S800) after the synthesizing of the images (S600).

The displaying of the image (S800) includes displaying the image with increasing the transparency of the vehicle V, when an obstacle O is overlapped with the vehicle V to be hidden in a three-dimensional around view image (S700).

Embodiments of the present invention are not implemented only by the above-described apparatus and/or method, but the scope of the present invention is not limited thereto, and various modifications and improvements by those skilled in the art using the basic concept of the present invention as defined in the following claims are also within the scope of the present invention.

What is claimed is:

1. An around view synthesis system, comprising:
   a plurality of cameras each mounted in a vehicle to capture respective different areas around the vehicle;
   a boundary setting unit setting a synthesis boundary of images captured in an overlapping region where images captured by the plurality of cameras are overlapped; and
   an image synthesizer receiving the images captured by the plurality of cameras and synthesizing the received images according to the synthesis boundary set by the boundary setting unit,
   wherein:
   the boundary setting unit detects an obstacle in the overlapping region and sets the synthesis boundary on the basis of the detection state of the obstacle;
   the boundary setting unit sets an upper layer among the images captured by the plurality of cameras that are overlapped in the overlapping region and sets a synthesis boundary of an image set as the upper layer on the basis of the detection state of the obstacle;
   when the same obstacle is detected in all the images captured by the plurality of cameras that are overlapped in the overlapping region, the boundary setting unit sets, as an upper layer, an image captured in a direction crossing an advancing direction of the vehicle and sets a synthesis boundary of the image set as the upper layer to be located outside the detected obstacle; and
   the image synthesizer synthesizes the upper layer and a lower layer among the images captured by the plurality of cameras.

2. The system of claim 1, wherein the plurality of cameras includes a first camera capturing a front of the vehicle; a second camera capturing a rear of the vehicle; a third camera capturing a left side of the vehicle; and a fourth camera capturing a right side of the vehicle.

3. The system of claim 1, further comprising a sensor detecting the obstacle around the vehicle,
   wherein the boundary setting unit detects the obstacle in the overlapping region using sensing information sensed by the sensor or the images captured by the plurality of cameras.

4. The system of claim 1, wherein when an obstacle is detected in only one image of the images captured by the plurality of cameras that are overlapped in the overlapping region, the boundary setting unit sets, as the upper layer, the image in which the obstacle is detected and sets the synthesis boundary of the image set as the upper layer to be located outside of the detected obstacle; and
   the image synthesizer synthesizes the upper layer and a lower layer among the images captured by the plurality of cameras.

5. The system of claim 1, wherein when only a part of obstacles detected in a first image among the images captured by the plurality of cameras that are overlapped in the overlapping region is detected in a second image, the boundary setting unit sets the synthesis boundary to be located outside an obstacle located at an outermost side of the obstacles detected in the first image.

6. The system of claim 1, wherein when obstacles different from each other are detected in the images captured by the plurality of cameras that are overlapped in the overlapping region, the boundary setting unit sets the synthesis boundary of the images to be located between the obstacles different from each other.

7. The system of claim 1, wherein the image synthesizer synthesizes a three-dimensional around view image facing the vehicle at a view point of a level higher than a vehicle body of the vehicle,
further comprising an image display displaying the three-dimensional around view image synthesized by the image synthesizer.

8. The system of claim 7, wherein the image display displays the image with increasing a transparency of the vehicle when the obstacle is overlapped with the vehicle to be hidden in the three-dimensional around view image.

9. An around view synthesis method, comprising:
capturing respective different areas around a vehicle by a plurality of cameras each mounted in the vehicle;
detecting an obstacle in an overlapping region where images captured by the plurality of cameras are overlapped using sensing information sensed by a sensor sensing the obstacle around the vehicle or the images captured by the plurality of cameras;
setting a synthesis boundary of images captured in the overlapping region on the basis of a detection state of the obstacle; and
synthesizing the images captured by the plurality of cameras according to the set synthesis boundary;
wherein:

the setting of the synthesis boundary includes setting an upper layer among images captured by the plurality of cameras that are overlapped in the overlapping region on the basis of the detection state of the obstacle, and setting a synthesis boundary of the image set as the upper layer;
when the same obstacle is detected in all the images captured by the plurality of cameras that are overlapped in the overlapping region, an upper layer is set as an image captured in a direction crossing an advancing direction of the vehicle and sets a synthesis boundary of the image set as the upper layer to be located outside the detected obstacle; and
the upper layer and a lower layer are synthesized from among the images captured by the plurality of cameras.

10. The method of claim 9, wherein the setting of the synthesis boundary includes detecting the position of the obstacle and setting the synthesis boundary on the basis of the detected position of the obstacle, when the obstacle is detected in the overlapping region.

11. The method of claim 9, further comprising:
synthesizing a three-dimensional around view image facing the vehicle at a view point of a level higher than a vehicle body of the vehicle in the synthesizing of the images; and
displaying the synthesized three-dimensional around view image after the synthesizing of the images.

12. The method of claim 11, wherein the displaying of the image includes displaying the image with increasing a transparency of the vehicle, when the obstacle is overlapped with the vehicle to be hidden in the three-dimensional around view image.

* * * * *